United States Patent [19]
Viegas

[11] Patent Number: 6,062,030
[45] Date of Patent: May 16, 2000

[54] HYBRID TEMPERATURE CONTROL SYSTEM

[75] Inventor: Herman H. Viegas, Bloomington, Minn.

[73] Assignee: Thermo King Corporation, Minneapolis, Minn.

[21] Appl. No.: 09/216,130

[22] Filed: Dec. 18, 1998

[51] Int. Cl.[7] ................................................. F25B 7/00
[52] U.S. Cl. ............................. 62/175; 62/239; 62/332
[58] Field of Search ............................. 62/332, 175, 268, 62/239

[56] References Cited

U.S. PATENT DOCUMENTS

| | | | |
|---|---|---|---|
| 3,159,982 | 12/1964 | Schachner | 62/175 |
| 3,507,128 | 4/1970 | Murphy et al. | 62/63 |
| 4,060,400 | 11/1977 | Williams | 62/162 |
| 4,233,817 | 11/1980 | Toth | 62/175 |
| 4,856,285 | 8/1989 | Acharya et al. | 62/63 |
| 4,858,445 | 8/1989 | Rasovich | 62/374 |
| 5,170,631 | 12/1992 | Lang et al. | 62/63 |
| 5,694,776 | 12/1997 | Sahm | 62/63 |

*Primary Examiner*—Henry Bennett
*Assistant Examiner*—Marc Norman
*Attorney, Agent, or Firm*—Michael M. Gnibus

[57] ABSTRACT

A hybrid temperature control system for controlling the temperature of the air in a conditioned space, and including a mechanical temperature control unit having primary evaporator means for reducing the temperature of conditioned space air, the first evaporator means utilizing a refrigerant to remove the heat from the air; the hybrid temperature control system further comprising supplemental evaporator means located a distance from the primary evaporator means, the supplemental evaporator means utilizing a cryogen to remove additional heat from the air to further reduce the temperature of the conditioned space air.

15 Claims, 7 Drawing Sheets

HYBRID TEMPERATURE CONTROL SYSTEM

BACKGROUND OF THE INVENTION

The invention relates to a temperature control system for pulling down the temperature in a conditioned space to a set point temperature, and for maintaining the set point temperature of the conditioned space; and more particularly the invention relates to a hybrid temperature control system that includes a first evaporator coil which utilizes a first heat absorbing fluid to provide primary temperature control of the conditioned space air and a second evaporator coil a distance from the first evaporator coil where the second evaporator coil utilizes a second heat absorbing fluid to provide supplemental temperature control of the conditioned space air.

Mobile temperature control units are typically mounted on one end of trailers, trucks or containers to maintain the cargo transported in the trailer, truck, or container conditioned space at a desired set point temperature during shipment. Known temperature control units may be mechanical units which utilize a hydroflurocarbon-based refrigerant to maintain the conditioned space ambient fluid at the desired set point temperature. As illustrated schematically in FIG. 1, prior art mechanical temperature control unit 10 is generally comprised of a compressor 11 that raises the pressure of a known refrigerant gas, a condenser 12 flow connected to the compressor to condense the high pressure refrigerant gas to a liquid, and an expansion valve 13 for controlling the refrigerant flow to an evaporator 14. The evaporator 14 includes evaporator coils 17 which are enclosed by an evaporator housing 20 having an evaporator inlet 16 through which conditioned space air enters the evaporator and an evaporator discharge 18 through which conditioned space air reenters the conditioned space.

Warm conditioned space air flows into the evaporator inlet 16, continues across the evaporator coils 17 and is discharged through evaporator discharge 18. The refrigerant that flows through the evaporator coils 17 absorbs heat from the conditioned space air, and in this way pulls down the temperature of the conditioned space air to a predetermined set point temperature and thereby maintains the conditioned space at the set point temperature.

In operation, high cooling capacities are needed to pull down a higher temperature conditioned space to the desired lower set point temperature in a relatively short time. After the conditioned space has been pulled down to the desired set point temperature, the cooling capacities required to maintain the conditioned space set point temperature are modest relative to the required pull down cooling capacities.

Conventional mechanical temperature control units provide the required variable cooling capacities by utilizing a compressor prime mover (not shown in FIG. 1) that drives the compressor at high and low speeds to provide high and low cooling capacities. However, even known mechanical temperature control units that utilize multi-speed prime movers cannot provide the cooling capacities required during peak demand periods. For example, during transportation of cargo, the doors to the trailer or truck are typically left open while the cargo is unloaded from the conditioned space. The temperature of the cargo conditioned space increases as the warm outside ambient air flows into the trailer conditioned space. The doors may be left open for an hour or more during unloading. After the delivery has been made and the doors are again closed, the conditioned space is pulled down to reestablish the conditioned space set point temperature. If the temperature of the conditioned space is not pulled down quickly, the load can spoil. Known mechanical units cannot provide the cooling capacity needed to quickly initially pull down the conditioned space or reestablish the set point temperature after cargo unloading.

In order for known mechanical units to achieve the desired pull down capacities, the size of conventional mechanical refrigeration units would need to be increased considerably. However this is not a realistic alternative since such units would be too large to be effectively used in the trailer, truck or container applications and such larger capacity mechanical units would be higher in cost, would be less efficient, would weigh more and would be noisier than conventional mechanical units.

A non-mechanical temperature control unit has been developed to meet the peak cooling demands at initial pull down and during pull down to reestablish the set point temperature in the conditioned space. Such non-mechanical temperature control units utilize a cryogen fluid to produce the desired cooling in the conditioned space. FIG. 2 schematically illustrates a prior art cryogen-based temperature control system 30 that includes a supply of cryogen liquid in cryogen tank 32 and the cryogen may be liquid carbon dioxide $LCO_2$ for example. An electronic expansion valve 34 or other valve means regulates the supply of cryogen through the evaporator coil 38 of evaporator 36. A microprocessor 37 adjusts the expansion valve position by sending a signal to the valve in response to the sensed temperature at the evaporator unit 36. A vapor motor 40 drives a fan 45 which draws conditioned space air through the evaporator 36 and across the evaporator coil 38. The rotating vapor motor turns alternator 41 which charges a temperature control unit battery (not shown).

The higher temperature conditioned space air is drawn into the evaporator and across coil 38. The cryogen liquid flowing through the evaporator coil absorbs heat from the conditioned space air and the lower temperature air is discharged from the evaporator 36 into the conditioned space in the direction of arrows 43. The cryogen is vaporized as it absorbs heat from the conditioned space air. The cryogen vapor flows out of the evaporator and drives the vapor motor 40. The spent cryogen vapor is exhausted from the vapor motor to atmosphere through exhaust 42 and muffler 39.

The liquid cryogen can provide the cooling capacity required to quickly pull down the conditioned space. However, there are limitations associated with non-mechanical, cryogenic based temperature control units. First, cryogen units are limited by how fast one wants to drop the cargo temperature and by practical considerations so that fresh loads such as produce are not frozen. The supply of cryogen typically only lasts one to three days and when the cryogen supply is exhausted the tank must be refilled. It may be difficult to locate a cryogen filling station. If the cryogen units are to provide a defrost and heating capability, a heating fuel and necessary heating components must be provided.

Hybrid mechanical and non-mechanical temperature control systems have been developed. These systems directly spray a volume of cryogen into the conditioned space during pull down of the conditioned space to the set point temperature. As a result, the conditioned space air is displaced and the conditioned space is comprised primarily of cryogen which is undesirable for most applications. The cryogen is not breathable and can negatively affect some foods.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a hybrid temperature control system including a mechanical temperature control system that includes a primary evaporator having a first evaporator coil with a first heat absorbing fluid adapted to flow through the first coil to absorb heat from the conditioned space air and provide primary cooling of the conditioned space air. The hybrid temperature control system further includes a supplemental evaporator located a distance from the first evaporator coil. The supplemental evaporator includes a supplemental evaporator coil with a second heat absorbing fluid adapted to flow through the supplemental evaporator coil to provide supplemental cooling of the conditioned space air.

The first heat absorbing fluid is a conventional refrigerant and the second heat absorbing fluid is a cryogen.

By the present invention supplemental cooling of the conditioned space air by the supplemental evaporator is controlled by a microprocessor or by the unit operator so that supplemental cooling is only provided when required such as during initial pull down of the conditioned space or during pull down to reestablish the conditioned space set point temperature.

The supplemental evaporator coil may be made integral with the mechanical refrigeration unit evaporator housing with the supplemental evaporator coil located immediately adjacent to the primary evaporator discharge. Additionally, the supplemental evaporator coil may be located a distance from the mechanical evaporator discharge by locating-the coil on a panel of the conditioned space, such as the ceiling; or along side the primary evaporator coil.

The invention may be utilized in both a conditioned space to be maintained at a single set point temperature and also in multi-temperature applications having a first conditioned space to be maintained at a first temperature with a first primary evaporator and a first supplemental evaporator a distance from or along side the first primary evaporator; and second conditioned space at a second set point temperature with a second primary evaporator, and a second supplemental evaporator a distance from the second primary evaporator.

When the present invention is used in a multi-temperature application with a number of conditioned spaces, any of the conditioned spaces may be maintained at the lowest set point temperature.

The foregoing and other aspects will become apparent from the following detailed description of the invention when considered in conjunction with the accompanying drawing figures.

DESCRIPTION OF THE DRAWING FIGURES

DESCRIPTION OF THE PREFERRED EMBODIMENT

Figure 3:
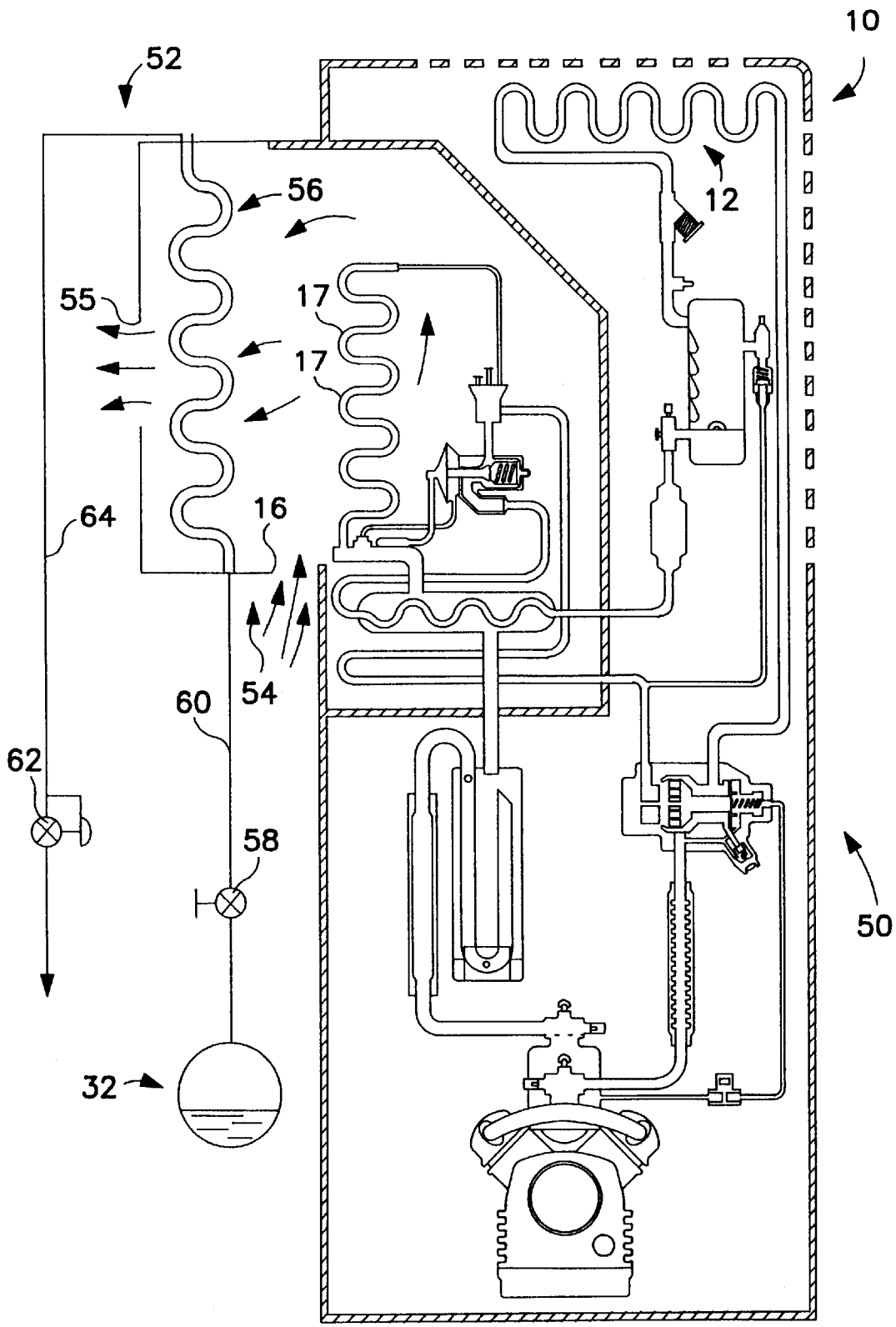
FIG. 3 is a first embodiment of the hybrid temperature control system of the present invention.
Figure 4:
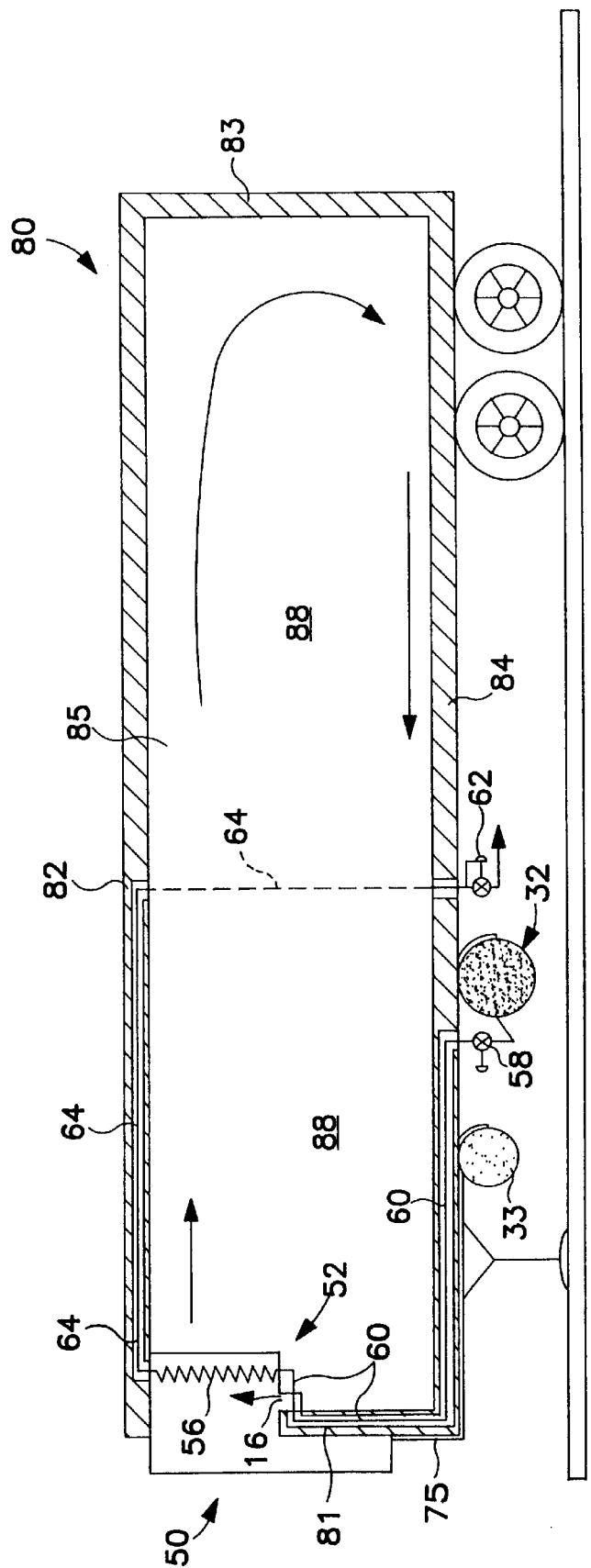
FIG. 4 is a longitudinal sectional view of a conventional trailer including the hybrid temperature control unit of FIG. 3.

Turning now to the drawings wherein like parts are referred to by the same number throughout the several views, FIGS. 3 and 4 illustrate a first embodiment of the hybrid temperature control system 50 of the present invention. As shown in FIG. 3, the hybrid temperature control system 50 is comprised of the mechanical temperature control system 10 as previously described hereinabove and supplemental cooling unit 52 a distance from mechanical evaporator coil 17.

As the description proceeds, the supplemental cooling unit 52 will be described as being manually actuated. It should be understood that it is also contemplated that the unit 52 will be actuated by a microprocessor or other suitable electronic means.

Figure 1:
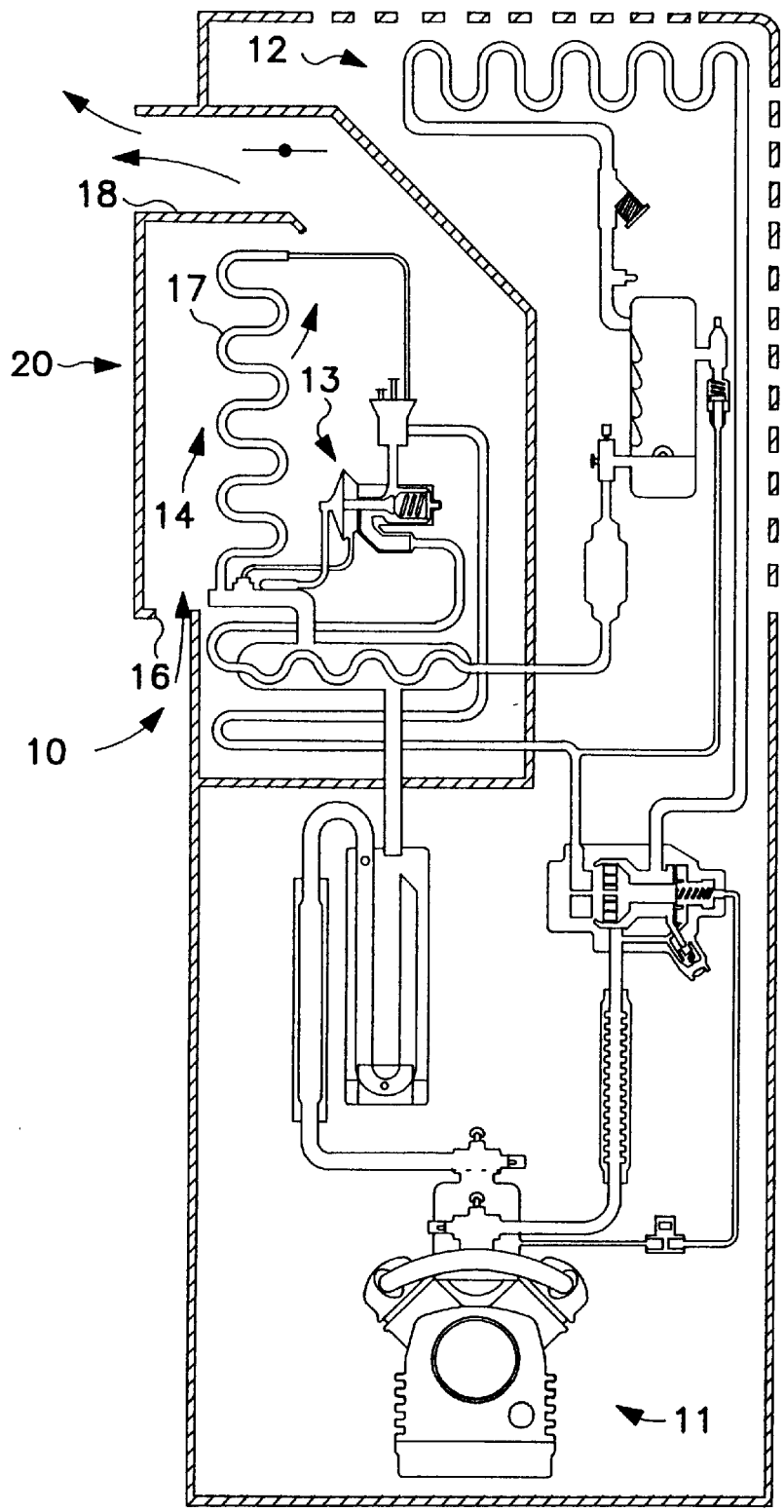
FIG. 1 is a schematic representation of a conventional mechanical temperature control system.
Figure 2:
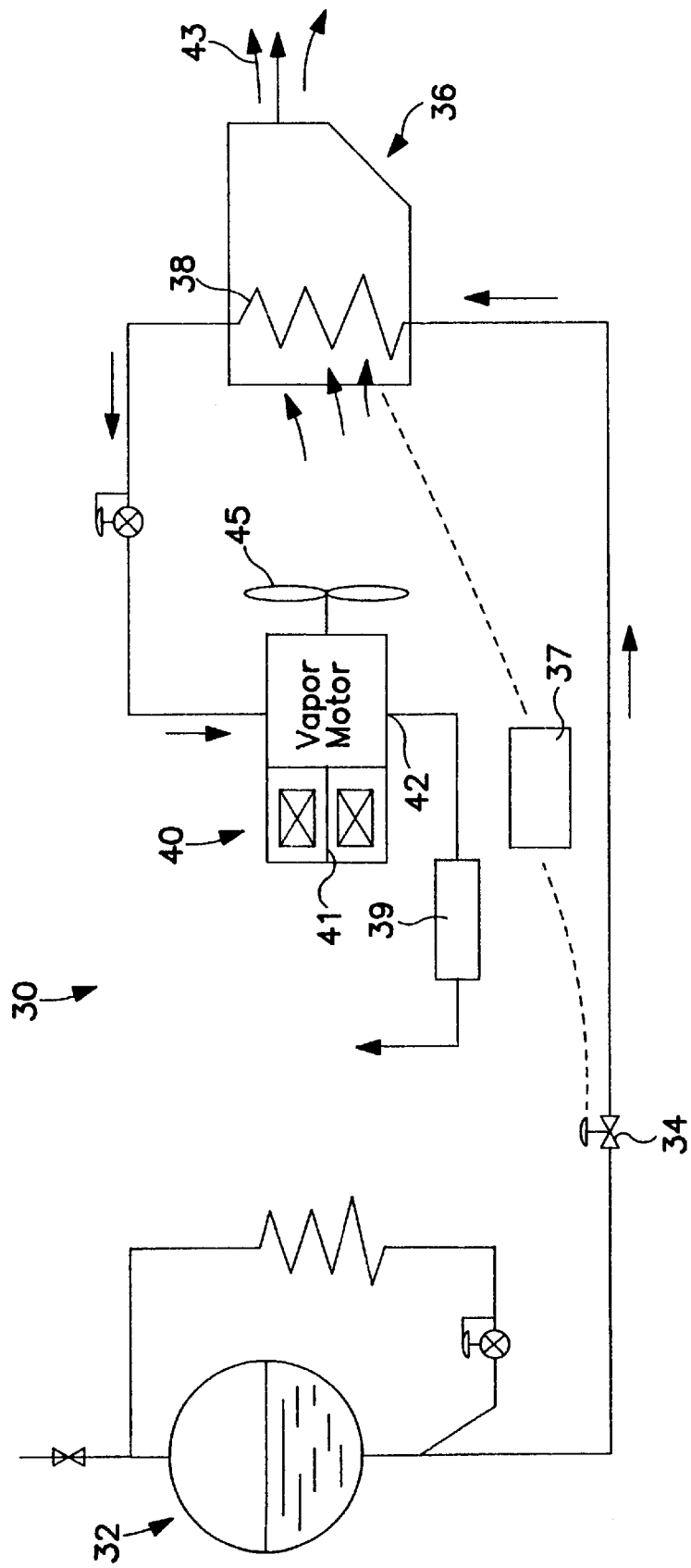
FIG. 2 is a schematic representation of a conventional non-mechanical, cryogen-based temperature control system.

As illustrated in FIG. 3 the evaporator housing 20 of FIG. 1 is extended and the extended housing is identified at 54. The housing includes inlet 16 and discharge opening 55. A supplemental evaporator coil 56 is located in the housing extension a distance from the evaporator coil 17. Although one row of cryogen evaporator coils 56 is shown in FIGS. 3 and 4 it should be understood that additional rows of coils 56 may be provided.

The heat absorbing fluid in supplemental cooling unit 52 is a cryogen liquid that is stored in cryogen tank 32. The cryogen liquid flows through the supplemental evaporator coil and is vaporized in the supplemental coil during operation of unit 50. The supply of liquid cryogen through the supplemental evaporator coil 56 is controlled by valve 58 flow connected along the length of the inlet line 60 that flow connects the cryogen tank and the cryogen evaporator coil 56. Valve 58 may be any suitable valve well known to one skilled in the art such as a manually actuated butterfly valve or may be an electronic expansion valve for example. However, the suitable valve 56 permits for selectively supplying cryogen to coil 56 and adjusting the volume of cryogen provided to the coil. A conventional back pressure valve 62 is located in exhaust line 64. The valve 62 may be an electronically a manually or a spring actuated back pressure valve. The inlet line 60 is located in front trailer panel 81, bottom panel 84 and passes through the bottom panel. See FIG. 4.

It should be understood that valves 58 and 62 and associated lines 60, 64 are shown schematically in FIGS. 3 and 4 for illustrative purposes only and the valves may be located in unit 50 with associated flow lines located in the trailer panels.

FIG. 4 illustrates the first embodiment hybrid temperature control unit of the present invention 50 mounted for use on the nose of trailer 80. The trailer includes front 81, top 82, rear 83, bottom 84, and side panels 85 that define a conditioned space 88. The cryogen tank 32 and the fuel tank 33 for the compressor prime mover are mounted on the bottom side of the trailer in a conventional manner. The exhaust line 64 extends through the trailer top panel 82, side panel 85, and the flow line 64 passes through the bottom panel 84. A conventional fuel supply line 75 flow connects fuel tank 33 and the prime mover (not shown) of mechanical unit 10.

Although conditioned space 88 is shown and described as being defined by a trailer, it should be understood that the conditioned space could be defined by a truck, container, bus, railway car or other enclosed volume or space requiring the temperature in the enclosed conditioned space to be maintained at a predetermined set point temperature.

Operation of the first embodiment hybrid temperature control unit 50 of the present invention will now be described. When it is determined that supplemental cooling by supplemental evaporator coil 56 is needed to provide rapid pull down of the air in the conditioned space 88, the operator starts the mechanical unit 10 is started and is set in defrost mode prior to using supplemental cooling. This will avoid the chance situation that the mechanical unit will go into defrost mode during supplemental cooling. Then after a period of time, valve 58 is opened either electronically or manually to permit liquid cryogen to flow from tank 32 through line 60 to supplemental evaporator coil 56. The mechanical temperature control unit 10 is started before the valve 58 is opened.

Higher temperature conditioned space air is drawn through inlet 16 and across the primary evaporator coils 17. The refrigerant flowing through the coils 17 absorbs heat from the conditioned space air and thereby provides primary cooling to the conditioned space air. The lower temperature conditioned space air continues across supplemental evaporator coils 56. The cryogen flowing through the supplemental coils absorbs additional heat from the already cool conditioned space air. After passing the coils 56 the cooled ambient fluid is discharged from housing 54 through opening 55 back into conditioned space 88. The vaporized cryogen is exhausted out exhaust 64 to atmosphere. None of the vaporized cryogen enters the conditioned space.

The supplemental cooling can be stopped manually or with a timer to automatically shut off the flow of cryogen. The valve "on" time varies for each particular application and is generally dependent on the ambient conditions, cargo, and required conditioned space set point temperature. The supplemental cooling may be shut off by a temperature switch.

The supplemental evaporation provided by supplemental evaporator coil 56 provides rapid pull down of conditioned space 88. Because the cryogen is released to atmosphere the cargo in the space 88 is not exposed to cryogen gas or fluid. The application of supplemental cooling may be selectively applied to meet peak demand such as during pull downs. Therefore, frequent refills of the cryogen tank are not required.

Figure 5:
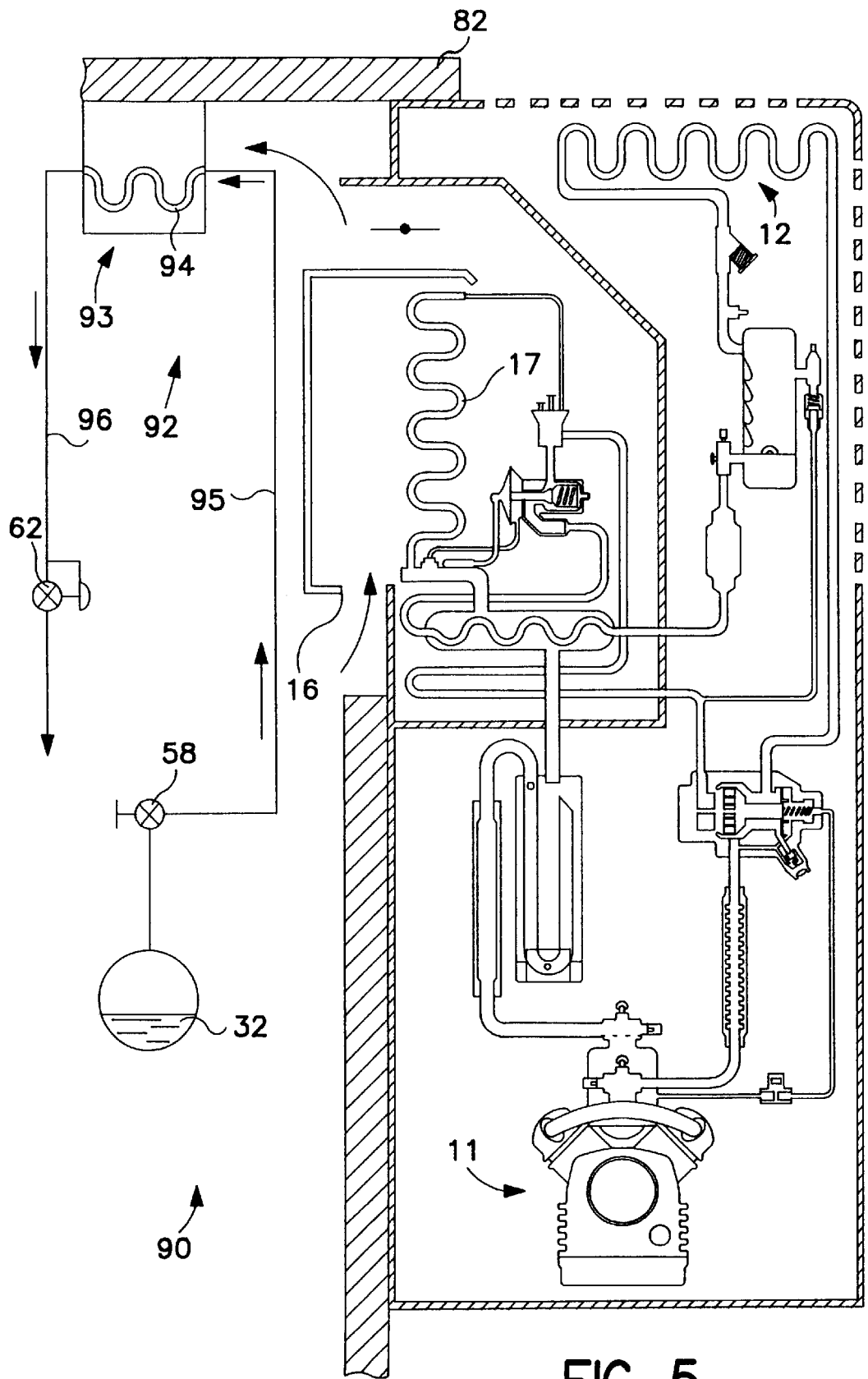
FIG. 5 is a second embodiment of the hybrid temperature control system of the present invention.
Figure 6:
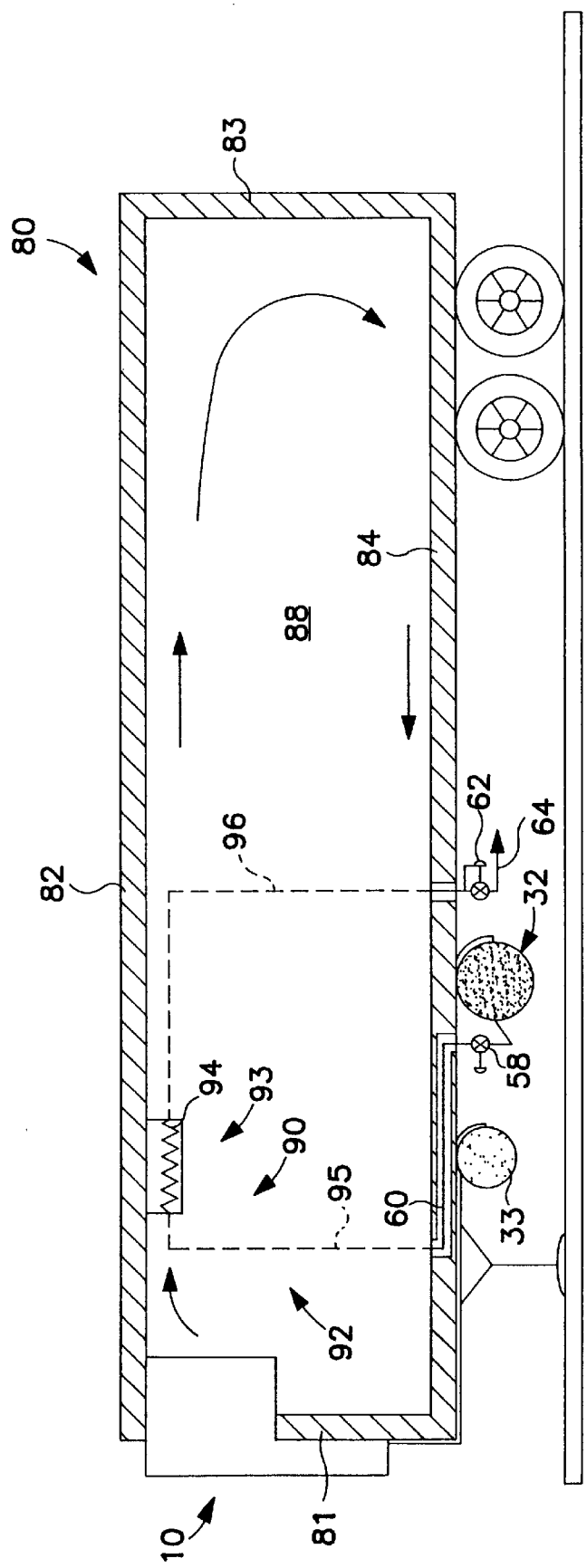
FIG. 6 is a longitudinal sectional view of a conventional trailer including the second embodiment hybrid temperature control system of FIG. 5.

A second embodiment hybrid temperature control unit 90 is illustrated in FIGS. 5 and 6. The second embodiment unit 90 includes mechanical unit 10 as previously described hereinabove and also includes supplemental cooling unit 92. The supplemental cooling unit is adapted for use with trailer 80 also previously described.

The supplemental cooling unit is comprised of cryogen tank 32 with flow of the cryogen from the tank being regulated by valve 58. A supplemental evaporator 93 is mounted on the interior of trailer roof panel 82 in conditioned space 88 a distance from the evaporator 14 of mechanical temperature control unit 10. The evaporator 93 may also be located along side evaporator 14. The supplemental evaporator is mounted on the roof panel in a conventional manner. The supplemental evaporator 93 has a supplemental evaporator coil 94 that is flow connected to supply line 95 and discharge line 96 that extends through roof 82 to atmosphere. Valve 58 is connected to supply line 95 outside the conditioned space. The supply line passes through the bottom panel of the trailer 80. Back pressure valve 62 is located in the discharge line 96 outside the trailer conditioned space. Although line 96 is shown extending in panel 88 and line 95 extending through panel 85 and bottom panel 84 with valves 58 and 62 located outside the trailer, the lines and valves may assume any suitable configuration and location.

It is easy to retrofit existing mechanical temperature control units with supplemental cooling units 92 by mounting the supplemental evaporator a distance from evaporator 14 in the flow path of the mechanical unit evaporator, and by connecting the associated supply and discharge flow lines to the supplemental evaporator coil.

The second embodiment hybrid temperature control system operates in the manner previously described in conjunction with the first embodiment hybrid temperature control system.

Figure 7:
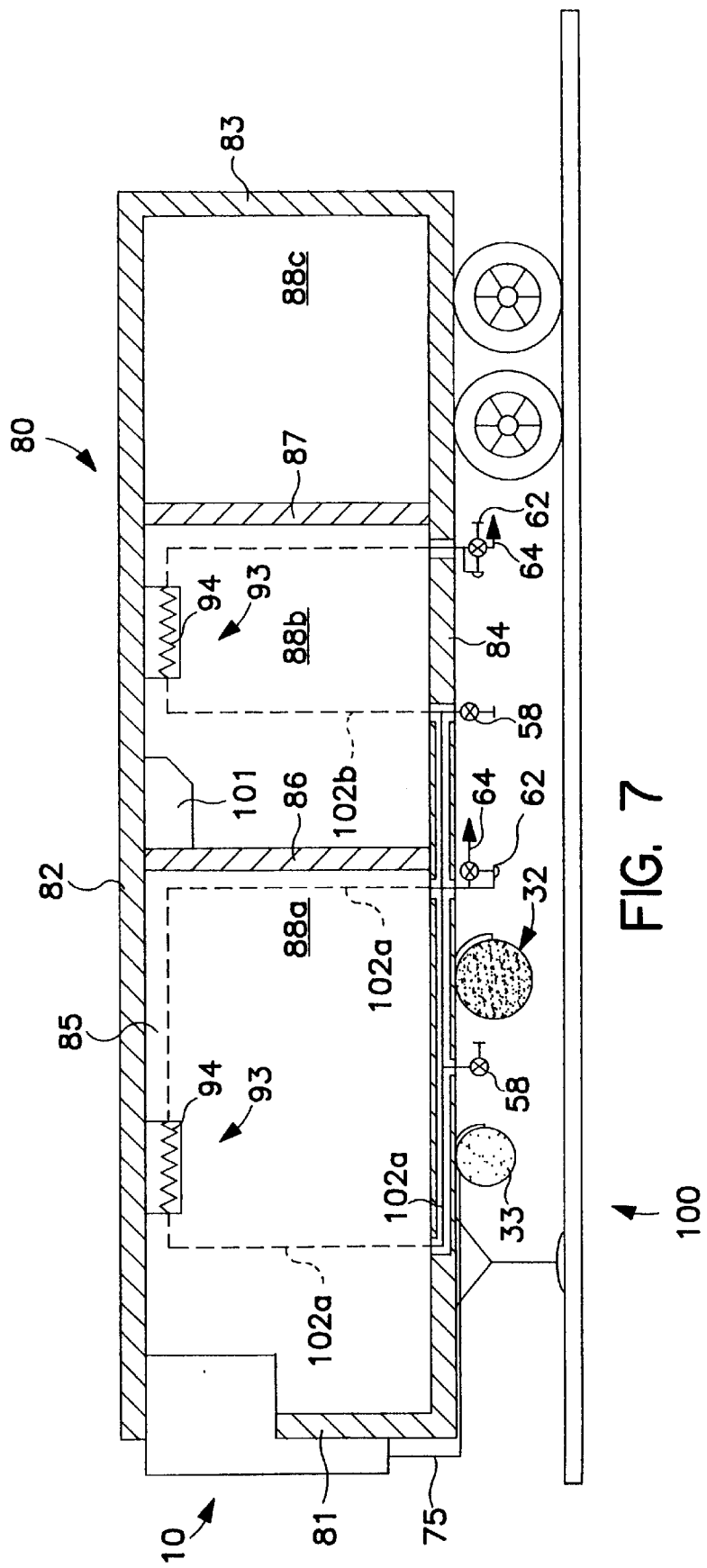
FIG. 7 is a longitudinal section view of a conventional trailer illustrating a third embodiment hybrid temperature control system of the present invention.

FIG. 7 illustrates a third embodiment hybrid temperature control unit 100 that includes the trailer 80, mechanical temperature control unit 10 and supplemental cooling units 92 previously described in conjunction with first and second embodiments 50 and 90, however the third embodiment unit 100 is related to a multi-temperature control unit.

As illustrated in FIG. 7, the conditioned space 88 is further divided into first conditioned space 88a by lateral partition 86 and is divided into second and third conditioned spaces 88b and 88c by lateral partition 87. Primary and supplemental cooling is supplied to conditioned spaces 88a and 88b however primary and supplemental cooling could be provided to third conditioned space 88c as well if desired. One or more of the conditioned spaces may be provided with supplemental cooling units. In operation either the first or second spaces 88a, 88b may have the lowest set point temperature.

Primary mechanical evaporator 101 is flow connected to mechanical unit in a manner well known to one skilled in the art so that during operation the refrigerant is supplied from unit 10 through evaporators 14 and 101. Flow lines 102a and 102b flow connect supplemental evaporator coils 94 to tank 32. Lines 102a and 102b extend through the side panel 85 and bottom panel 84 of the trailer but like other lines previously described may assume any suitable configuration.

Third embodiment hybrid temperature control unit operates in the manner previously described except that the supplemental cooling may be provided to a conditioned space independent of other supplemental cooling units. For example, if the second conditioned space is partially unloaded, once the doors to the center space are closed, the supplemental cooling may be selectively provided only to the second conditioned space to pull down the second conditioned space and no supplemental cooling is provided to the first conditioned space 88a. In this way the cryogen is not used unnecessarily.

The present invention hybrid temperature control system provides many benefits and advantages over present mechanical and cryogenic temperature control units. The hybrid temperature control system of the present invention boosts the cooling capacity of a conventional cooling unit, and provides maximum capacity as needed, especially during initial pull-down and for quick recovery to load set point temperature after door openings. By the present invention the operator may locate the coldest cargo in any conditioned space, there is no requirement to place the coldest cargo in the front conditioned space. Mechanical components can be designed to meet the more steady state cooling needs with the supplemental evaporator providing cooling during peak loads. As a result of the present invention the unit is quieter than equivalent mechanical units and weighs less than mechanical units. The physical size of the hybrid unit of the present invention is smaller than a conventional mechanical unit. This is an important benefit since mechanical units are typically mounted on the front of the trailer, truck or container where space is at a premium. The lower weight unit also lowers the center of gravity of the vehicle. Engine/compressor speed can be lowered and thereby increase their useful lives. Mechanical system can be simplified to have a single speed to handle steady state operation. This simplifies the control system and also increases unit reliability. The present invention provides air flow, heating, defrost, and cooling for extended periods and very high cooling capacities for rapid pull down and temperature recovery after door openings.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A hybrid temperature control system for controlling the temperature of the air in a first conditioned space, the hybrid temperature control system comprising: a mechanical temperature control unit having primary evaporator means for reducing the temperature of first conditioned space air, the primary evaporator means utilizing a first heat absorbing fluid to remove the heat from the first conditioned space air; the hybrid temperature control system further comprising a supplemental cooling unit comprising supplemental evaporator means located a distance from the primary evaporator means, the supplemental evaporator having a discharge line, an inlet line, a supplemental evaporator coil joining the inlet and discharge lines, the supplemental evaporator coil made integral with the primary evaporator coil, the supplemental cooling system further comprising; second heat absorbing fluid storage means; and valve means connected to the inlet line, the valve means for controlling the supply of second heat absorbing fluid to the supplemental evaporator coil, the supplemental cooling unit utilizing a second heat absorbing fluid to remove additional heat from the first conditioned space air to further reduce the temperature of the first conditioned space air.

2. The hybrid temperature control system as claimed in claim 1 wherein the second heat absorbing fluid is a cryogen.

3. The hybrid temperature control system as claimed in claim 1 wherein the first heat absorbing fluid is a refrigerant.

4. The hybrid temperature control system as claimed in claim 1 wherein the valve means is comprised of a manually actuated valve.

5. The hybrid temperature control system as claimed in claim 1 wherein the primary evaporator is substantially enclosed by a housing, and wherein the supplemental evaporator coil is located in the primary evaporator housing.

6. The hybrid temperature control system as claimed in claim 1 wherein the first conditioned space is defined by a plurality of sides, wherein the supplemental evaporator means is mounted on one of the sides defining the first conditioned space.

7. The hybrid temperature control system as claimed in claim 5 wherein the first conditioned space includes a top side, the supplemental evaporator coil being mounted on the top side.

8. The hybrid temperature control system as claimed in claim 5 further comprising a second conditioned space with a second primary evaporator and second supplemental cooling unit located in the second conditioned space, the second supplemental cooling unit having a second supplemental evaporator located a distance from the second primary evaporator; the second primary evaporator utilizing the first heat absorbing fluid to lower the temperature of the second conditioned space air and the second supplemental cooling unit utilizing the second heat absorbing fluid to further reduce the temperature of the second conditioned space air discharged from the second primary evaporator.

9. The hybrid temperature control unit as claimed in claim 8 wherein the second conditioned space is defined by a plurality of sides, the second supplemental cooling unit includes a second supplemental evaporator mounted on one of the sides.

10. The hybrid temperature control unit as claimed in claim 8 wherein the first and second conditioned spaces define the interior of a trailer with a front end and a rear end, the first conditioned space being located at the front trailer end and the second conditioned space being located at the rear trailer end, the set point temperature of the second conditioned space being lower than the set point temperature of the first conditioned space.

11. A combination comprising:
  A) a first conditioned space;
  B) a hybrid temperature control system for controlling the temperature of the first air in the first conditioned space, the hybrid temperature control system comprising: a mechanical temperature control unit having primary evaporator means for reducing the temperature of first conditioned space air, the primary evaporator means utilizing a first heat absorbing fluid to remove the heat from the first conditioned space air; the hybrid temperature control system further comprising supplemental evaporator means located a distance from the primary evaporator means, the supplemental cooling unit utilizing a second heat absorbing fluid to remove additional heat from the first conditioned space air to further reduce the temperature of the first conditioned space air; and
  C) a second conditioned space with a second primary evaporator and second supplemental cooling unit located in the second conditioned space, the second supplemental cooling unit having a second supplemental evaporator located a distance from the second primary evaporator; the second primary evaporator utilizing the first heat absorbing fluid to lower the temperature of the second conditioned space air and the second supplemental cooling unit utilizing the second heat absorbing fluid to further reduce the temperature of the second conditioned space air discharged from the second primary evaporator.

12. The combination as claimed in claim 11 wherein the second heat absorbing fluid is a cryogen and the first heat absorbing fluid is a refrigerant.

13. The hybrid temperature control unit as claimed in claim 11 wherein the second conditioned space is defined by a plurality of sides, the second supplemental cooling unit includes a second supplemental evaporator mounted on one of the sides.

14. The combination as claimed in claim 11 wherein the set point temperature of the second conditioned space is lower than the set point temperature of the first conditioned space.

15. The combination as claimed in claim 13 wherein the second conditioned space has a top side, the second primary and supplemental evaporators being mounted on the top side.

* * * * *